United States Patent [19]

Hausmann

[11] Patent Number: 5,824,412
[45] Date of Patent: *Oct. 20, 1998

[54] THERMOPLASTIC POLYBUTYLENE TEREPHTHALATE COMPOSITIONS FOR WIRE COATING APPLICATIONS

[75] Inventor: Karlheinz Hausmann, Neuchatel, Switzerland

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 620,481

[22] Filed: Mar. 22, 1996

Related U.S. Application Data

[63] Continuation of Ser. No. 211,624, filed as PCT/US92/08956 Oct. 26, 1992 published as WO93/08234, Apr. 29, 1993, abandoned, and a continuation-in-part of Ser. No. 781,459, Oct. 24, 1991, abandoned.

[51] Int. Cl.$^6$ .................................................. C08L 67/02
[52] U.S. Cl. ........................... 428/378; 428/379; 525/63; 525/64; 525/69; 525/166; 525/173; 525/176; 525/444
[58] Field of Search ..................................... 428/378, 379, 428/69; 525/166, 173, 176, 63, 444

[56] References Cited

U.S. PATENT DOCUMENTS

| | | | |
|---|---|---|---|
| Re. 31,680 | 9/1984 | Caywood, Jr. .......................... | 525/285 |
| 3,884,887 | 5/1975 | Montgomery .......................... | 260/80.75 |
| 3,907,926 | 9/1975 | Brown et al. ............................ | 260/860 |
| 4,167,505 | 9/1979 | Dunkelberger .......................... | 260/37 N |
| 4,221,703 | 9/1980 | Hoeschele ......................... | 260/45.9 NC |
| 4,548,988 | 10/1985 | Castelein ..................................... | 525/71 |
| 4,578,429 | 3/1986 | Gergen et al. .......................... | 525/291 |
| 4,871,810 | 10/1989 | Saltman ................................... | 525/133 |
| 5,091,459 | 2/1992 | Howe ....................................... | 524/456 |
| 5,128,404 | 7/1992 | Howe ....................................... | 524/456 |

FOREIGN PATENT DOCUMENTS

| | | | |
|---|---|---|---|
| 0013461 | 12/1979 | European Pat. Off. ......... | C08G 18/42 |
| 290 588-A | 11/1987 | European Pat. Off. ......... | C08L 23/00 |
| A-0420017 | 4/1991 | Germany ......................... | C08L 75/04 |
| 61-148261 | 7/1986 | Japan ............................. | C08L 67/02 |
| 62-034951 | 2/1987 | Japan ............................. | C08L 67/02 |
| 03250044 | 11/1991 | Japan ............................. | C08L 67/02 |
| 87/02921 | 11/1986 | WIPO ............................. | B23K 37/04 |
| 8702921 | 11/1987 | WIPO . | |
| 88/03543 | 11/1987 | WIPO ............................. | C08L 23/00 |
| 8803543 | 5/1988 | WIPO . | |
| WO 91/13119 | 2/1991 | WIPO ............................. | C08L 67/02 |
| WOA9119767 | 12/1991 | WIPO ............................. | C08L 67/02 |

*Primary Examiner*—Patricia A. Short
*Attorney, Agent, or Firm*—Craig H. Evans

[57] ABSTRACT

Thermoplastic compositions based on polybutylene terephthalate are provided which are useful in high temperature resistant wire coating applications. These compositions generally are four-component alloys with reduced ethylene copolymer (ionomer) content.

10 Claims, No Drawings

THERMOPLASTIC POLYBUTYLENE TEREPHTHALATE COMPOSITIONS FOR WIRE COATING APPLICATIONS

CROSS-REFERENCE TO RELATED APPLICATION

This is a continuation of application Ser. No. 08/211,624, filed as PCT/US92/08956 Oct. 26, 1992 published as WO93/08234, Apr. 29, 1993, now abandoned, which is a continuation-in-part of U.S. application Ser. No. 07/781,459; filed Oct. 24, 1991, now abandoned.

BACKGROUND OF THE INVENTION

1. Field of Invention

This invention relates to thermoplastic compositions useful in wire coating applications and more particularly to such compositions which are halogen-free and useful in high temperature resistant wire coating applications.

2. Background Problems and Art

Due to the increasing density of components under the hood of today's high performance cars, temperature requirements of the insulation materials of wires and cables used in such applications become more and more demanding. This is the more important as the current working horse for these applications, polyvinyl chloride (PVC) is being considered more and more as an environmental threat, and the industry is therefore looking for a halogen-free, thermoplastic and high temperature resistant material which would fulfil the requirements of today's cars and be able to replace PVC at the same time. Today's requirements consist of retaining sufficient elongation after 3000 h at 135° C. while showing a minimum of discoloration, good chemical resistance, and good low temperature flexibility.

Some materials described in published European Patent Application No. EP-290 588-A (Saltman) have been found to meet these requirements. This patent application describes elastomeric thermoplastic polymers prepared by meltgrafting three components: an engineering thermoplastic (e.g. nylon, polyester, copolyester ether, copolyester ester, or polycarbonate), an ionomer, and a polymeric grafting agent. In particular, this patent application describes polymer alloys which comprise, in general:

a) 25–50% volume of at least one thermoplastic resin;

b) 10–74% volume of at least one ethylene copolymer E/X/Y where E is >50% wt ethylene X is 1–35% wt of an acid-containing unsaturated monocarboxylic acid and Y is 0–49% wt of a moiety derived from at least one alkyl acrylate, alkylmethacrylate, vinyl ether, carbon monoxide, sulfur dioxide, or mixtures thereof, where the alkyl and ether radicals contain 1–12 carbon atoms and further wherein the acid groups in the acid-containing moiety are neutralized from 0–100% by a metal ion;

c) 1–50% volume of at least one polymeric grafting agent which contains reactive groups selected from at least one of epoxides, isocyanates, aziridine silanes, alkylating agents, that react with the acid-containing moieties in component b) and that additionally react with the reactive graft sites of component a).

The aforesaid EP-290 588-A describes various elastomeric thermoplastic polymer compositions having good high temperature properties. For wire and cable (W and C) coatings, such coatings must show a minimal degradation of properties after ageing 3000 hours at 135° C. Other thermoplastic resins which do not contain any reactive groups are described in U.S. Pat. No. 4,871,810 (Saltman).

Alloys within EP-290 588 where the engineering thermoplastic is based on nylon 6 or nylon 6.6 and which contain around 50% of engineering thermoplastic resin, 5% of component c) and 45% of component b) show excellent ageing characteristics, good abrasion resistance, excellent low temperature flexibility and good hydrolytic resistance. Also the chemical resistance is outstanding. With these properties, these materials can be used for under the hood applications where a continuous service temperature of 135°–140° C. is required.

At higher temperatures, i.e., about 150° C., materials based on nylon are less useful for under the hood applications since they show marked degradation of properties. Therefore, an engineering polymer within EP-290 588-A having a higher temperature resistance should be used, such as a polyester-based alloy. Polybutylene terephthalate (PBT) is selected as the base engineering thermoplastic because it is known to have a higher temperature resistance, better wet electrical properties and to show less discoloration after ageing; a lower abrasion resistance is a known disadvantage. It was discovered, however, that the ageing performance of PBT-based alloys in extruded wire coatings is inferior to the compositionally identical plaque stock.

SUMMARY OF THE INVENTION

According to the present invention there is provided a partially grafted, flexible thermoplastic composition formed by melt blending comprising:

(a) 40–65% by weight of poly (1,4-butylene) terephthalate;

(b) 1–30% by weight of a polymeric grafting agent which is a copolymer of at least 50% by weight ethylene, 0.5–15% by weight of at least one reactive moiety selected from the group consisting of (i) an unsaturated epoxide of 4–11 carbon atoms, (ii) an unsaturated isocyanate of 2–11 carbon atoms, (iii) an alkoxy or alkyl silane wherein the alkyl group is from 1–12 carbon atoms, (iv) an alkyl halide, (v) an alkyl alpha-halo ketone or aldehyde, and (vi) oxazoline, and 0–49% by weight of a moiety selected from at least one of an alkyl acrylate, alkyl methacrylate, vinyl ether, carbon monoxide, and sulfur dioxide, where the alkyl and ether groups above are of 1–12 carbon atoms;

(c) 0–20% by weight of an ethylene copolymer which comprises at least 50% by weight of ethylene, 1–35% by weight of an acid-containing unsaturated monocarboxylic acid, and 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion; and (d) at least one of:
  (i) 0–25% by weight of a thermoplastic elastomer selected from the group consisting of a copolyester ester and a copolyether ester;
  (ii) 0–45% by weight of a styrene/diene block copolymer, with 3 or more sequences, of the S-(D-S)$_n$ structure where n is a whole number, S is a polystyrene block, D is a hydrogenated isoprenic block or hydrogenated butadienic block, with a content in styrene less than 50% by weight optionally grafted with maleic anhydride;
  (iii) 0–25% by weight of an adduct of maleic anhydride and a copolymer of ethylene, at least one $C_3$ to $C_6$ alphaolefin, and at least one nonconjugated diene; or
  (iv) 0–25% by weight of an acrylic-modified elastomer-based polymer wherein the elastomeric portion is polymerized from a monomer mixture containing at least 50% by weight of at least one $C_1$ to $C_{15}$ alkyl acrylate, 0–5% by weight of at least one graftlinking monomer, 0–5% by weight of a crosslinking monomer, and the balance to 100% by weight of at least other polymerizable ethylenically unsaturated monomer;

provided that:

(1) the total of (a)–(d) is 100%;

(2) the total polyester content of (a) and (d) (i) does not exceed 70%; and (3) if (c) is 0%, then (d) cannot be (i), (iii), and (iv), and (ii) can be 10–45% by weight.

Also provided is an insulated wire which comprises an electrically conductive wire having a coating thereon of one of the aforesaid compositions.

DETAILED DESCRIPTION OF THE INVENTION

The compositions of the present invention are partially grafted, flexible thermoplastic 3- or 4-component alloys based on poly (1,4-butylene) terephthalate (PBT). These PBT alloys, when extruded as wire coatings, show minimal discoloration and a retention of mechanical properties after ageing 3000 hours at 150° C. (e.g., at least 50% of elongation at break is retained).

The phrase "partially grafted" is meant to indicate that in the compositions of the present invention the grafting agent is the limiting component, i.e., the addition of more grafting agent than is permitted by the definition of this invention would result in further grafting and the creation of an intractable composition.

In particular, this invention relates to partially grafted flexibile thermoplastic compositions based on PBT.

The three or four components described above are melt blended with each other under high shear. The various ingredients may first be combined with one another in what is commonly referred to as a "salt and pepper" blend, i.e., a pellet blend, of each of the ingredients, or they may be combined with one another via simultaneous or separate metering of the various components, or they may be divided and blended in one or more passes into one or more sections of mixing equipment such as an extruder, Banbury, Buss Kneader, Farrell continuous mixer, or other mixing equipment. For example, one can use an extruder with two or more feed zones into which one or more of the ingredients may be added sequentially. In this case, it is sometimes advantageous that the thermoplastic and polymeric grafting component be combined first, then the acid-containing copolymer be added downstream. This helps promote the grafting reaction(s) between the thermoplastic and polymeric grafting components, prior to the reaction(s) between the polymeric grafting component and acid-containing copolymer. However, the order of addition does not have any effect on the high temperature properties described by this invention. The high shear insures proper dispersion of all the components such as would be necessary to carry out the grafting reaction. In addition, sufficient mixing is essential to achieve the morphology which is necessary in the compositions of the present invention. The morphology required for the compositions of the present invention is that at least one of continuous phases must be the thermoplastic; i.e., component (a).

The PBT base thermoplastic resin (a) useful in this invention has a number average molecular weight greater than 7500, preferably greater than 10,000. Such resins are available commercially. The compositions of the invention contain generally 40–65% by weight PBT with the preferred content depending upon the composition and content of the other three components. Preferably, the compositions contain between 50 and 65% by weight PBT; the total polyester content of the compositions being no greater than 65% otherwise the compositions will be too stiff and have inferior ageing properties.

Polymeric grafting agents (b) useful in the compositions of the inventions are ethylene copolymers copolymerized with one or more reactive moieties selected from unsaturated epoxides of 4–11 carbon atoms, such as glycidyl acrylate, glycidyl methacrylate, allyl glycidyl ether, vinyl glycidyl ether, and glycidyl itaconate, unsaturated isocyanates of 2–11 carbon atoms, such as vinyl isocyanate and isocyanato-ethyl methylacrylate, aziridine, silanes such as alkoxy or alkyl silanes, alkylating agents such as alkyl halides or alpha-halo ketones or aldehydes or oxazoline and may additionally contain an alkyl acrylate, alkyl methacrylate, carbon monoxide, sulfur dioxide and/or vinyl ether, where the alkyl radical is from 1–12 carbon atoms. In particular, the polymeric grafting agent is a copolymer of at least 50% by weight ethylene, 0.5–15% by weight of at least one reactive moiety selected from the group consisting of (i) an unsaturated epoxide of 4–11 carbon atoms, (ii) an unsaturated isocyanate of 2–11 carbon atoms, (iii) an alkoxy or alkyl silane wherein the alkyl group is from 1–12 carbon atoms, (iv) an alkyl halide, (v) an alkyl alpha-halo ketone or aldehyde, and (vi) oxazoline, and 0–49% by weight of a moiety selected from at least one of an alkyl acrylate, alkyl methacrylate, vinyl ether, carbon monoxide, and sulfur dioxide, where the alkyl and ether groups above are of 1–12 carbon atoms.

Preferred polymeric grafting agents for use in the compositions of the present invention include ethylene/glycidyl acrylate, ethylene/n-butyl acrylate/glycidyl acrylate, ethylene/methylacrylate/glycidyl acrylate, ethylene/glycidyl methacrylate, ethylene/n-butyl acrylate/glycidyl methacrylate and ethylene/methylacrylate/glycidyl methacrylate copolymers. The most preferred grafting agents for use in the compositions of the present invention are copolymers derived from ethylene/n-butyl acrylate/glycidyl methacrylate and ethylene/glycidyl methacrylate.

A preferred polymeric grafting agent is a copolymer of at least 55% by weight ethylene, 1–10% by weight of an unsaturated epoxide of 4–11 carbon atoms, and 0–35% by weight of at least one alkyl acrylate, alkyl methacrylate, or mixtures thereof where the alkyl groups contain 1–8 carbon atoms. Preferred unsaturated epoxides are glycidyl methacrylate and glycidyl acrylate which are present in the copolymer at a level of 1–7% by weight. Preferably, ethylene content is greater than 60% by weight and the third moiety is selected from methyl acrylate, iso-butyl acrylate, and n-butyl acrylate.

The polymeric grafting agents concentration in the compositions of the invention is 1–30% by weight, preferably 2 or 5 to 15 or 20% or even to 30% by weight depending upon the nature and content of the other components.

Ethylene copolymers (c) useful in the present invention comprise at least 50% by weight of ethylene, 1–35% by weight of an acid-containing unsaturated mono-carboxylic acid, and 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion;

Preferred ethylene copolymers comprise at least 60% by weight of ethylene, 5–15% by weight of acrylic acid or methacrylic acid, and 0–25% by weight of a moiety selected from at least one of methyl acrylate, iso-butyl acrylate and n-butyl acrylate, and further wherein the acid groups are neutralized from 0–70%, preferably from 30–70%, by at least one metal ion selected from lithium, potassium, sodium, zinc, magnesium, aluminium, and calcium.

Suitable preferred ethylene copolymers include ethylene/acrylic acid, ethylene/methacrylic acid, ethylene/acrylic acid/n-butyl acrylate, ethylene/methacrylic acid/n-butyl acrylate, ethylene/methyacrylic acid/iso-butyl acrylate, ethylene/acrylic acid/iso-butyl acrylate, ethylene/methacrylate acid/n-butyl methacrylate, ethylene/acrylic acid/methyl methacrylate, ethylene/acrylic acid/ethyl vinyl ether, ethylene/methacrylic acid/butyl vinyl ether ethylene/acrylic acid/methyl acrylate, ethylene/methacrylic acid/methyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether. The most preferred ethylene copolymers for use in the compositions of the present invention are ethylene/methacrylic acid, ethylene/acrylic acid copolymers, ethylene/methacrylic acid/n-butyl acrylate and ethylene/methacrylic acid/methylacrylate terpolymers.

The ethylene copolymer concentration in the compositions of the invention is 0–20% by weight, provided that when there is 0 ethylene copolymer present, then a 3-component composition is possible with styrene/diene block copolymer (d) (ii). Also, when more than 15% by weight ethylene copolymer is present, then a thermoplastic elastomer (d) (i) and/or a styrene/diene block copolymer (d) (ii) should be present in the composition. The preferred ethylene copolymer concentration in the compositions of the invention depend on the nature and content of the other components, but will generally be from 5–15% by weight.

Thermoplastic elastomers (d) (i) useful in the compositions of this invention are copolyester esters and copolyether esters. Copolyether esters are preferred and are described in U.S. Pat. No. 4,221,703 to Hoeschele, the disclosure of which is herein incorporated by reference. Preferred copolyether esters are prepared from dimethyl terephthalate, 1,4-butanediol, and poly (tetramethylene oxide) glycol having a molecular weight of about 600–2000 or poly(ethylene oxide) glycol having a molecular weight of about 600–1500. Optionally, up to about 30 mole % and preferably 5–20 mole % of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole % and preferable 10–25 mole % of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers.

Copolyester ester elastomers are described in EP-013461 to Huntjens, the disclosure of which is herein incorporated by reference. Preferred copolyester esters are prepared from polybutylene adipate of various molecular weights and aliphatic or aromatic diisocynates, particularly toluene diisocyanate, having a molecular weight in the range of 500–5000.

The concentration of thermoplastic elastomers in the compositions is 0–25% by weight. In general, these elastomers are used when ethylene copolymer (c) is used at a concentration greater than 15% by weight. The elastomers are used to complement the thermoplastic PBT phase so as to obtain higher abrasion resistance, higher flexibility, lower discoloration, improved ageing performance after extrusion, and improved chemical resistance. When used in wire coating applications, the total polyester content should not exceed 70%. A particularly beneficial composition for wire coating applications comprises:

(a) 40–65% by weight PBT;
(b) 2–30% by weight of a preferred polymeric grafting agent;
(c) 0–20% by weight of a preferred ethylene copolymer; and
(d) 10–25% by weight of a preferred copolyether ester;

Another particularly beneficial composition comprises:

(a) 40–65% by weight PBT;
(b) 5–20% by weight of a preferred polymeric grafting agent;
(c) 10–20% by weight of a preferred ethylene copolymer; and
(d) 10–20% by weight of a preferred copolyether ester.

Still another comprises:

(a) 40–65% by weight PBT;
(b) 2–30% by weight of a preferred polymeric grafting agent;
(c) 0–20% by weight of a preferred ethylene copolymer;
(d) (i) 5–15% by weight of a preferred copolyether ester; and
(iv) 5–15% by weight of a preferred acrylic modified, elastomer based on polymer as described below.

and still another comprises:

(a) 40–65% by weight PBT;
(b) 2–30% by weight of a preferred polymeric grafting agent;
(c) 0–20% by weight of a preferred ethylene copolymer; and
(d) (i) 5–15% by weight of a preferred copolyether ester
(iii) 5–15% by weight of a preferred "maleic anhydride addict of an ethylene copolymer as described below".

The concentration of styrene/diene block copolymers (d) (ii) in the composition is 0–45% by weight. In general, these copolymers replace all or part of ethylene copolymer (c) in the composition. Useful styrene/diene block copolymers are described in U.S. Pat. No. 4,548,988 to Castelein, the disclosure of which is incorporated by reference. In general, these copolymers have 3 or more sequences of the S-(D-S)$_n$ structure where n is a whole number, S is a polystyrene block, D is a hydrogenated isoprenic block or hydrogenated butadienic block, with a content in styrene less than 50% by weight. Optionally, these block copolymers can be grafted with maleic anhydride so as to form adducts which contain 0.1 to 10% by weight, preferably 0.2 to 5%, of maleic anhydride (see U.S. Pat. No. 4,578,429).

A particularly beneficial composition for wire coating applications comprises:

(a) 50–65% by weight of PBT;
(b) 56–15% by weight of a preferred polymeric grafting agent;
(c) 0–10% by weight of a preferred ethylene copolymer; and
(d) 20–45% by weight of a preferred styrene/diene block copolymer.

The concentration of an adduct of maleic anhydride and an ethylene copolymer (d) (iii) in the composition is 0–25% by weight. Useful adducts of maleic anhydride with an ethylene copolymer and their preparation are described in U.S. Pat. No. 3,884,887 and U.S. Re. 31,680, both to Caywood, the disclosures of which are incorporated by reference. These elastomeric copolymers of ethylene are composed of ethylene, at least one $C_3$ to $C_6$ alpha-olefin, preferably propylene, and at least one nonconjugated diene, preferably 1,4 hexadiene alone or with 2,5-norbornadiene. The maleic anhydride content of the adduct is 0.5 to 9% by weight, preferably 1–4% by weight; and the adduct has an inherent viscosity of at least 1, preferably at least 1.5, as measured on 0.1 gram of adduct copolymer dissolved in 100 milliliters of perchloroethylene at 30° C. A particularly beneficial composition for wire coating applications comprises:

(a) 50–65% by weight PBT;

(b) 5–15% by weight of a preferred polymeric grafting agent;

(c) 5–10% by weight of a preferred ethylene copolymer; and (d) 10–25% by weight of a preferred maleic anhydride adduct of an ethylene copolymer.

The concentration of acrylic-modified elastomer-based polymer (d) (iv) in the composition is 0–25% by weight. In general, these polymers are also used with low concentrations of ethylene copolymer (c). Useful acrylic-modified elastomeric-based polymers and their preparation are described in U.S. Pat. No. 4,167,505 to Dunkelberger, the disclosure of which is incorporated by reference. Those described in column 4, lines 39–55 are most preferred.

The acrylic-elastomer polymers have an elastomeric portion which is polymerized from a monomer mixture containing at least 50% by weight of at least one $C_1$ to $C_{15}$ alkyl acrylate, 0–5% by weight of at least one graftlinking monomer, 0–5% by weight of a crosslinking monomer, and the balance to 100% by weight of at least other polymerizable ethylenically unsaturated monomer. Suitable graftlinking monomers and crosslinking monomers are described in column 3, lines 34–48 of U.S. Pat. No. 4,167,505.

Preferred polymers are an elastomeric-based acrylic core/shell polymer having:

(1) 70–80 parts by weight of a first acrylic elastomeric stage comprising a polymer polymerized from a monomer mixture comprising 79–99.5 parts n-butyl acrylate, 0–10 parts of at least one polymerizable monoethylenically or conjugated diethylenically unsaturated monomer, 0.1–5 parts 1,4-butylene glycol diacrylate and 0.1–5 parts diallyl maleate; and (2) 20–30 parts by weight hard shell final stage polymer polymerized in the presence of said first elastomeric stage from a monomer mixture comprising about 80–100 parts by weight methyl methacrylate, 0–20 parts of another monoethylenically unsaturated monomer and 0–5 parts monoethylenically A particularly beneficial composition for wire coating applications comprises:

(a) 50–65% by weight PBT;

(b) 5–20% by weight of a preferred polymeric grafting agent;

(c) 5–15% by weight of a preferred ethylene copolymer; and (d) 15–25% by weight of a most preferred acrylic-modified elastomer-based polymer.

The composition of the present invention totals 100% of components (a)–(d). Of course, the compositions can include other ingredients as are customarily used in the conventional compounding of thermoplastics, provided that such other ingredients are no more than 100 parts by weight per 100 parts by weight of components (a)–(d). Examples of such other ingredients include carbon black, metal deactivators, glass fibers, graphite fibers, KEVLAR® (aramid) fibers, glass spheres, plasticizers, lubricants, silica, titanium dioxide, pigments, clay, mica and other mineral fillers, flame retardants, antioxidants, ultraviolet stabilizers, heat stabilizers, processing aids, adhesives and tackifiers.

The invention can be further understood by the following examples in which parts and percentages are by weight unless indicated otherwise and temperatures are in degrees Celsius.

The invention is a thermoplastic elastomer composition based on PBT containing a grafting component which is prepared by melt blending and is preferably used for applications in wire and cable insulations intended for automotive under the hood applications. These compositions show high temperature resistance, good low temperature flexibility, superior chemical resistance as well as high abrasion resistance.

The process for preparing the compositions and the insulation of the wire includes:

1. Careful drying of all the major ingredients.

2. Preparing a pellet blend together with the antioxidants in a tumble blender.

3. Melt blending and melt grafting of the blend in a twin screw extruder.

4. Pelletizing the strands by a strand cutter.

5. Drying of the pellets.

6. Extruding the blends onto wire.

7. Injection molding of test plaques. Instead of applications in wire coating the aforementioned blends have also shown utility in injection molding, and due to the increased viscosity, in blow molding applications.

Description of Process Steps

1. The preparation of the pellet blend was undertaken in the following manner:
   Polyester is usually dried for 3 hours at 110° C. under vacuum, thermoplastic copolyesters, 3 hours at 1000° C., elastomeric ingredients several hours at 800° C. and the ionomer for at least 24 hours at 400° C. under dry nitrogen purge. The moisture content of none of the ingredients should be higher than 0.05%.

2. After drying, the components were weighed and pellet blended, antioxidants were added. Then they were mixed in a tumble blender.

3. For meltblending, a 24 mm Berstorff twin screw extruder was used. A high shear screw design was used to melt blend these compositions in order to obtain intimate mixing of the components and favorable properties.

The temperature profile which was applied for compositions of this invention was the following:

| Zone | 1 | 2 | 3 | 4 | 5 | 6 | Die | Melt |
|---|---|---|---|---|---|---|---|---|
| Temp. (°C.) | 200 | 235 | 235 | 235 | 235 | 240 | 240 | 255–270 |

Usually a screw speed of 180–200 rpm was used which leads to a compounding speed of approximately 7–14 kg/h. Meltgrafted compositions can also be prepared using twin screw extruders of different sizes, using internal mixers (Brabenders), using Banburies and Farell continuous mixers, and by feeding of the components of the compositions through different ports of the mixing devices.

4. The extruded strands were cooled in a waterbath and cut with a strandcutter into pellets.
5. The pelletized resin was dried for at least 3 hours at 110° C. to a moisture level of less than 0.05% and then placed in heat sealed bags.
6. Extrusion onto wire:

In order to extrude the compositions onto wire, a 30 mm Maillefer wire coating line was used. Usually, a barrier screw (design "ELISE") was used for extrusion, but metering screws with a compression ratio ranging from 2:1 to 4:1 as well as metering screws with Maddox Mixing heads are preferred. The output of the extruder at maximum screw speed was around 7.5 kg/h.

For the coating process a B+H 75 Crosslead was used with a pressure extrusion set-up attached to it. But also tubing extrusion is possible and was found to lead to good results. For pressure extrusion, the die was chosen with a diameter usually 20% bigger than the wire diameter.

The following temperature profile was applied:

|        | 1   | 2   | 3   | 4   | Adapt | Xhead | Die | Melt | Stock |
|--------|-----|-----|-----|-----|-------|-------|-----|------|-------|
| T(°C.) | 210 | 235 | 240 | 240 | 250   | 250   | 250 | 249  | 275   |

The materials were extruded on stranded bare copper wires. Two constructions were used: AWG 20, 7s (OD 0.97 mm) and 19×0.23 (0.75 mm*2) (OD 1.12 mm).

The compositions were then stripped off the copper wire using an insulation stripping device. The tubes (0.25–0.35 mm wall thickness) obtained by this method were aged in air circulated ovens for 24 hours at room temperature (50% R.H.).

A number of physical properties were measured for each composition. Unless otherwise noted, the samples were prepared and tested as follows. Melt Indices of the ethylene copolymers and the grafting agents were determined according to ASTM D-1238. Tensile properties (elastic modulus, tensile strength and elongation) at room temperature, 150° C., 165° C., and 180° C. were measured by Procedure IEC 540-5.1.. Percent retention of tensile strength at break was calculated from the individual reading taken at the elevated temperature as compared with room temperature readings. All of the samples were conditioned for at least 24 hours at 50% RH.

Other tests performed include wraptest (DIN 72551—part 5 item 3.4.8), and the scrape abrasion test (DIN 72551—part 5 item 3.3.3.). The thermoplastics, grafting agents, ethylene copolymers, and additives used in the Examples are set forth below.

In the following Examples, all percentages of components a–d are given by weight. All additives are given in parts per hundred based on the weight of components a–d.

The components and additives used in the examples are as follows:

a=polybutylene terephthalate having a density (g/cc) of 1.34 and a melt index (2160 g weight) of 8 @ 240° C.
b=a copolymer of 64.9% by weight ethylene, 28% by weight n-butyl acrylate, and 5.25% by weight of glycidyl methacrylate having a density (g/cc) of 0.94 and a melt index at 190° C./2.16 kg (g/10 min) of 20.0.
c=a copolymer of 66.9% by weight ethylene, 24.5% by weight of n-butyl acrylate, and 8.6% by weight of methacrylic acid neutralized at about 50% with Na ion. This polymer has a density (g/cc) of 0.94 and a melt index at 190° C./2.16 kg (g/10 min) of 1.0.
d (1)=a copolyester ester elastomer sold by Akzo N.V. as Arnitel® UM 550.
  (2)=a copolyether ester elastomer with 75% by weight butyleneterephtalate units and 25% by weight polytetramethylene ether (1000 Mn) terephthalate having a melt index (2160 g) of 13 at 220° C.
  (3)=a styrene/diene block copolymer sold by Shell Chemicals as Kraton® FG 1902X.
  (4)=a maleic anhydride adduct of an ethylene copolymer which is about 68% by weight ethylene, 26% by weight propylene, 6.3% by weight of 1,4-hexadiene, and 0.13% by weight of 2,5-norbomadiene grafted with fumaric acid to contain 1.5–2% maleic anhydride (melt index of 1–5 g/10 min.).
  (5)=an acrylic-modified polycarbonamide elastomer sold by Rohm and Haas Company as Paraloid® EXL 3373.

The additives used are the same for all examples; a blend of commercially available primary and secondary antioxidants and a metal deactivator.

TABLE I

Polybutylene Terephthalate Thermoplastic Elastomer Compositions

| Ex. No.   | wt % a | wt % b | wt % c | wt % d (No.) | wt % Additives |
|-----------|--------|--------|--------|--------------|----------------|
| Control 1 | 50.0   | 2.5    | 47.5   | —            | 2.3            |
| Control 2 | 50.0   | 5.0    | 45.0   | —            | 2.3            |
| Control 3 | 62.5   | 4.5    | 33.0   | —            | 2.3            |
| Control 4 | 50.0   | 5.0    | 45.0   | —            | 3.8            |
| 1         | 50.0   | 20.0   | 15.0   | 15(2)        | 3.8            |
| 2         | 50.0   | 25.0   | 10.0   | 15(2)        | 3.8            |
| 3         | 50.0   | 30.0   | 5.0    | 15(2)        | 3.8            |
| 4         | 40.0   | 20.0   | 15.0   | 25(2)        | 3.8            |
| 5         | 50.0   | 20.0   | 10.0   | 20(2)        | 3.8            |
| 6         | 50.0   | 20.0   | 15.0   | 15(1)        | 3.8            |
| 7         | 50.0   | 25.0   | 10.0   | 15(1)        | 3.8            |
| Control 5 | 65.0   | 5.0    | —      | 30(4)        | 3.8            |
| 8         | 65.0   | 5.0    | 10.0   | 20(4)        | 3.8            |
| 9         | 50.0   | 5.0    | —      | 45(3)        | 3.8            |
| 10        | 65.0   | 5.0    | —      | 30(3)        | 3.8            |
| 11        | 50.0   | 10.0   | 15.0   | 25(5)        | 3.8            |
| 12        | 50.0   | 20.0   | 5.0    | 25(5)        | 3.8            |
| 13        | 60.0   | 20.0   | 5.0    | 15(5)        | 3.8            |
| Control 6 | 50.0   | 5.0    | 45.0   | —            | 3.8            |
| 14        | 50.0   | 25.0   | 10.0*  | 15(2)        | 3.8            |
| 15        | 50.0   | 20.0   | 15.0   | 7.5(2)       | 3.8            |
| 16        | 60.0   | 10.0   | 10.0   | 7.5(2)       | 3.8            |
| 17        | 50.0   | 25.0   | 10.0   | 5(2)         | 17.8**         |
| 18        | 50.0   | 27.0   | 8.0    | 15(2)        | 17.8**         |
| 19        | 50.0   | 25.0   | 0      | 25(2)        | 3.8            |

*0% neutralization; MI of 30.
**Fire retardant includes 10% tetradecabromodisphenoxylbenzene and 4% $Sb_2O_3$ Physical properties were measured on test plaques and coated wire made from these compositions. The results are shown in Table II.

TABLE II

Physical Properties of Compositions of Table I

| | Plaque (as made) | | Wire Tube (as made) | | Plaque (Aged) | | | |
|---|---|---|---|---|---|---|---|---|
| Ex. No. | TS Break 23° C. MPa | % Elong Br. 23° C. | TS Br. 23° C. MPa | % Elong. Br. 23° C. | TS 165° C./2 wk | % Elong. 165° C./2 wk | TS 180° C./1 wk | % Elong. 180° C./1 wk. |
| Ctrl. 1 | — | — | 1.7 | 349 | — | — | — | — |
| Ctrl. 2 | 25.8 | 318 | 3.0 | 305 | 25.5 | 279 | 21.4 | 178 |
| Ctrl. 3 | 26.9 | 255 | 6.0 | 316 | 28.5 | 239 | 29.0 | 132 |
| Ctrl. 4 | 25.2 | 257 | 8.4 | 259 | 27.2 | 231 | 25.7 | 205 |
| 1 | 29.5 | 230 | 2.4 | 244 | 32.8 | 172 | 32.8 | 177 |
| 2 | 32.5 | 276 | 2.3 | 187 | 32.6 | 198 | — | — |
| 3 | — | — | 9.5 | 130 | — | — | — | — |
| 4 | — | — | 22 | 234 | — | — | — | — |
| 5 | — | — | 4.4 | 208 | — | — | — | — |
| 6 | 20.9 | 200 | 2.4 | 231 | 23.8 | 160 | — | — |
| 7 | — | — | 0.0 | 214 | — | — | — | — |
| Ctrl. 5 | — | — | 0.0 | 158 | — | — | — | — |
| 8 | 27.9 | 240 | 2.6 | 225 | 28.4 | 161 | — | — |
| 9 | — | — | 0.8 | 308 | — | — | — | — |
| 10 | — | — | 0.0 | 230 | — | — | — | — |
| 11 | — | — | 9.1 | 166 | — | — | — | — |
| 12 | 18.7 | 191 | 6.2 | 120 | 27.1 | 182 | — | — |
| 13 | — | — | 1.3 | 107 | — | — | — | — |
| Ctrl. 6 | — | — | 3.5 | 75 | — | — | — | — |
| 14 | — | — | 3.6 | 325 | — | — | — | — |
| 15 | — | — | 4.9 | 284 | — | — | — | — |
| 16 | — | — | 2.7 | 203 | — | — | — | — |
| 17 | — | — | 6.6 | 259 | — | — | — | — |
| 18 | — | — | 22 | 174 | — | — | — | — |
| 19 | — | — | 5.4 | 423 | — | — | — | — |

| | Tube Wire (Stripped & Aged) | | | | Tube Color after 180° C./1 wk (%) | Tube Abra. Resistance (%) | Tube retention of TS + % Elong. after aging 3000 hr/150° on wire | | | Processing Wire Coating |
|---|---|---|---|---|---|---|---|---|---|---|
| Ex. No. | TS 165° C./2 w | % Elong. 165° C./2 w | TS 180° C./1 wk | % Elong. 180° C./1 wk | | | Wrap Test | Ret. TS | Ret. Elong | |
| Ctrl. 1 | 20.5 | | 20. | 76 | dk. brown | 443 | pass | — | 0 | good |
| Ctrl. 2 | 21.3 | 82 | 24. | 12 | black | 492 | fail | 102 | 2 | good |
| Ctrl. 3 | 26.1 | 151 | 28. | 95 | dk. brown | 485 | pass | 108 | 5 | good |
| Ctrl. 4 | 21.1 | 165 | 19. | 54 | dk. brown | 577 | pass | 93 | 19 | good |
| 1 | 27.1 | 124 | 26. | 108 | tan | 1507 | pass | 124 | 53 | good |
| 2 | 27.7 | 124 | 28. | 116 | lt. tan | 1735 | pass | 124 | 53 | good |
| 3 | 24.2 | 114 | 25. | 84 | lt. tan | 1149 | pass | — | — | good |
| 4 | 25.3 | 121 | 25. | 88 | lt. tan | 1825 | pass | 115 | 30 | good |
| 5 | 28.6 | 108 | 29. | 73 | lt. tan | 1990 | pass | 119 | 40 | good |
| 6 | 27.6 | 126 | 28. | 113 | lt. brown | 1171 | pass | 108 | 34 | good |
| 7 | 24.7 | 145 | 23. | 93 | lt. brown | 952 | pass | 125 | 71 | good |
| Ctrl. 5 | 23.0 | 96 | 24. | 70 | yellow | 842 | pass | 82 | 9 | poor |
| 8 | 28.6 | 122 | 25. | 58 | yellow | 1141 | pass | 121 | 58 | good |
| 9 | 24.0 | 220 | 23. | 199 | yellow | 212 | pass | 87 | 43 | good |
| 10 | 28.7 | 119 | 29. | 110 | yellow | 336 | pass | 124 | 25 | good |
| 11 | 22.5 | 111 | 21. | 55 | br. yellow | 1195 | pass | 116 | 58 | good |
| 12 | 21.1 | 116 | 20. | 111 | br. yellow | 868 | pass | 136 | 99 | good |
| 13 | 26.0 | 84 | 26. | 74 | yellow | 986 | pass | 134 | 131 | good |
| Ctrl. 6 | 22.5 | 173 | 21. | 103 | lt. yellow | 117 | — | — | — | |
| 14 | 33 | 168 | 33 | 149 | dk. brown | 953 | — | — | — | |
| 15 | 28.1 | 155 | 27. | 136 | brown | 969 | pass | 90.7 | 50 | |
| 16 | 27.3 | 148 | 22. | 60 | lt. yellow | 1005 | pass | 99.6 | 36 | |
| 17 | 27.9 | 135 | 25 | 5 | lt. tan | 1529 | pass | 94.6 | 42 | |
| 18 | 26.3 | 84 | 31 | 109 | lt. tan | n/a | 11/3/92* | — | — | |
| 19 | 33.5 | 224 | 31. | 205 | tan | 1118 | pass | — | — | |

*Test results expected 11/92

The results of the above examples show that the compositions of the invention have a better retention of elongation after ageing on wire than the control compositions. The compositions of the invention also have better color retention than the control compositions. It is surprising when component (c) is reduced and partially replaced with component (d) and/or (b), that ageing properties of the coatings on wire are improved versus the measurement of the same properties on plaques (particularly elongation and discoloration).

What is claimed is:

1. A partially grafted, flexible thermoplastic composition formed by melt blending comprising:
   (a) 40–65% by weight of poly (1,4-butylene) terephthalate;

(b) 5–30% by weight of a polymeric grafting agent which is a copolymer of at least 50% by weight ethylene, 0.5–15% by weight of at least one reactive moiety selected from the group consisting of (i) an unsaturated epoxide of 4–11 carbon atoms, (i) an unsaturated isocyanate of 2–11 carbon atoms, (iii) an alkoxy or alkyl silane wherein the alkyl group is from 1–12 carbon atoms, (iv) an alkyl halide, (v) an alkyl alphahalo ketone or aldehyde, and (vi) oxazoline, and 0–49% by weight of a moiety selected from at least one of an alkyl acrylate, alkyl methacrylate, vinyl ether, carbon monoxide, and sulfur dioxide, where the alkyl and ether groups above are of 1–12 carbon atoms;

(c) about 5–20% by weight of an ethylene copolymer which comprises at least 50% by weight of ethylene, 1–35% by weight of an acid-containing unsaturated mono-carboxylic acid, and 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion; and (d) 5–25% by weight of a thermoplastic elastomer selected from the group consisting of a copolyester ester and a copolyether ester;

provided that:

(1) the total of (a)–(d) is 100%; and (2) the total polyester content of (a) and (d) does not exceed 70%.

2. The composition of claim 1 wherein the polybutylene terephthalate (a) has a number average molecular weight of at least 7500.

3. The composition of claim 2 wherein the polymeric grafting agent (b) is a copolymer of at least 55% by weight ethylene, 1–10% by weight of an unsaturated epoxide of 4–11 carbon atoms, and 0–35% by weight of at least one of an alkyl acrylate or alkyl methacrylate wherein the alkyl group in each is from 1–8 carbon atoms.

4. The composition of claim 1 wherein the polymeric grafting agent (b) is a copolymer of at least 55% by weight ethylene, 1–10% by weight of an unsaturated epoxide of 4–11 carbon atoms, and 0–35% by weight of at least one of an alkyl acrylate or alkyl methacrylate wherein the alkyl group in each is from 1–8 carbon atoms.

5. The composition of claim 1, 2, 4 or 3 wherein the polymeric grafting agent (b) is selected from the group consisting of a copolymer of ethylene/n-butyl acrylate/glycidyl methacrylate, and a copolymer of ethylene/glycidyl methacrylate.

6. The composition of claim 5 wherein ethylene copolymer (c) comprises at least 60% by weight of ethylene, 5–15% by weight of acrylic acid or methacrylic acid, and 0–25% by weight of a moiety selected from at least one of methyl acrylate, iso-butyl acrylate and n-butyl acrylate, and further wherein the acid groups are neutralized from 30–70% by at least one metal ion selected from lithium, potassium, sodium, zinc, aluminium, magnesium and calcium.

7. The composition of claim 1, 2, 4 or 3 wherein ethylene copolymer (c) comprises at least 60% by weight of ethylene, 5–15% by weight of acrylic acid or methacrylic acid, and 0–25% by weight of a moiety selected from at least one of methyl acrylate, iso-butyl acrylate and n-butyl acrylate, and further wherein the acid groups are neutralized from 30–70% by at least one metal ion selected from lithium, potassium, sodium, zinc, aluminium, magnesium and calcium.

8. The composition of claim 1, 2, 4 or 3 wherein the total polyester content does not exceed 65% by weight.

9. An insulated wire comprising an electrically conductive wire having coated thereon one of the composition of claim 1, 2, 4 or 3.

10. A partially grafted, flexible thermoplastic composition formed by melt blending comprising:

(a) 40–65% by weight of poly (1,4-butylene) terephthalate having a number average molecular weight of at least 7500;

(b) 5–30% by weight of a polymeric grafting agent which is a copolymer of at least 55% by weight ethylene, 1–10% by weight of glycidyl methacrylate, and 0–35% by weight of n-butyl acrylate;

(c) about 5–20% by weight of an ethylene copolymer comprising at least 60% by weight of ethylene, 5–15% by weight of acrylic acid or methacrylic acid, and 0–25% by weight of a moiety selected from at least one of methyl acrylate, iso-butyl acrylate and n-butyl acrylate, and further wherein the acid groups are neutralized from 30–70% by at least one metal ion selected from sodium, zinc, magnesium and calcium; and (d) 10–25% by weight of a copolyether ester which comprises a copolyether ester having 75% butyleneterephthalate units and 25% polytetramethylene ether (1000 Mn) terephthalate;

provided that:

(1) the total of (a)–(d) is 100%; and (2) the total polyester content of (a) and (d) does not exceed 70%.

* * * * *